(12) United States Patent
Yamasaki

(10) Patent No.: US 10,831,181 B2
(45) Date of Patent: Nov. 10, 2020

(54) ADDITION CONTROLLER, ADDITION CONTROL METHOD, AND PROGRAM

(71) Applicant: Kobe Steel, Ltd., Hyogo (JP)

(72) Inventor: Takemasa Yamasaki, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 16/069,180

(22) PCT Filed: Jan. 24, 2017

(86) PCT No.: PCT/JP2017/002285
§ 371 (c)(1),
(2) Date: Jul. 11, 2018

(87) PCT Pub. No.: WO2017/141639
PCT Pub. Date: Aug. 24, 2017

(65) Prior Publication Data
US 2019/0025798 A1    Jan. 24, 2019

(30) Foreign Application Priority Data

Feb. 16, 2016    (JP) .................................. 2016-027353

(51) Int. Cl.
*G05B 19/4099* (2006.01)
*B33Y 50/02* (2015.01)
(Continued)

(52) U.S. Cl.
CPC ............ *G05B 19/4099* (2013.01); *B22F 3/16* (2013.01); *B23K 9/04* (2013.01); *B23K 9/0953* (2013.01);
(Continued)

(58) Field of Classification Search
None
See application file for complete search history.

(56) References Cited

U.S. PATENT DOCUMENTS

| 5,233,150 A | 8/1993 | Schneebeli et al. |
| 2011/0072660 A1 | 3/2011 | Flesch et al. |

(Continued)

FOREIGN PATENT DOCUMENTS

| CN | 103433487 A | 12/2013 |
| CN | 105252119 A | 1/2016 |

(Continued)

OTHER PUBLICATIONS

Huan Qi & Magdi Azer & Prabhjot Singh, Adaptive toolpath deposition method for laser net shape manufacturing and repair of turbine compressor airfoils, : Aug. 30, 2009, Springer-Verlag London Limited, retrieved from the internet <https://rd.springer.com/article/10.1007/s00170-009-2265-7> (Year: 2009).*

(Continued)

*Primary Examiner* — Kenneth M Lo
*Assistant Examiner* — Istiaque Ahmed
(74) *Attorney, Agent, or Firm* — Studebaker & Brackett PC

(57) ABSTRACT

In a trajectory determination device (40); a CAD data acquisition unit (41) acquires shape data representing the shape of a three-dimensional structure; a trajectory data generating unit (43) and layering conditions adjusting unit (44) generate, on the basis of the shape data acquired by the CAD data acquisition unit (41), control information which is information for controlling a layering device for layering molten metal for forming the structure and which indicates the trajectory for the layering device and/or layering conditions when the layering device layers molten metal such that the upper surface of one layer of a plurality of layers of molten metal layered is flat; and a control program output unit (45) outputs the control information generated by the trajectory data generating unit (43) and the layering conditions adjusting unit (44).

3 Claims, 11 Drawing Sheets

(51) Int. Cl.
  B23K 26/342 (2014.01)
  B33Y 50/00 (2015.01)
  B23K 9/095 (2006.01)
  B22F 3/16 (2006.01)
  B23K 9/12 (2006.01)
  B23K 9/04 (2006.01)

(52) U.S. Cl.
  CPC ............ *B23K 9/124* (2013.01); *B23K 26/342* (2015.10); *B33Y 50/02* (2014.12); *B33Y 50/00* (2014.12); *G05B 2219/41342* (2013.01)

(56) References Cited

U.S. PATENT DOCUMENTS

| 2013/0186939 A1* | 7/2013 | Zaffino | B23K 9/044 228/102 |
| 2015/0108096 A1* | 4/2015 | Daniel | B23K 9/044 219/76.12 |

FOREIGN PATENT DOCUMENTS

| JP | H06-155026 A | 6/1994 |
| JP | 2000-015363 A | 1/2000 |
| JP | 2005-152918 A | 6/2005 |
| JP | 2015-160217 A | 9/2015 |

OTHER PUBLICATIONS

Abdullah Wagiman, Md Saidin Wahab, Mohd Amri Lajis, Azuddin Mamat, Improving Surface Smoothness of Aluminium Alloys Multi-Bead Weld for Welding Rapid Forming Application, Jul. 15, 2015, retrieved from internet <https://www.scientific.net/AMM.773-774.216> (Year: 2015).*

Int J Adv Manuf Technol; 2010; 48; 121-131; pp. 129-130; Springer. Berezovskii et al.; "Optimisation of the formation of a metal layer in arc deposition"; Welding International; Jan. 1, 1991; pp. 888-891; vol. 5, No. 11; XP000230532; GB.

The extended European search report issued by the European Patent Office dated Sep. 13, 2019, which corresponds to European Patent Application No. 17752903.9-1016 and is related to U.S. Appl. No. 16/069,180.

* cited by examiner

FIG. 5
(a)
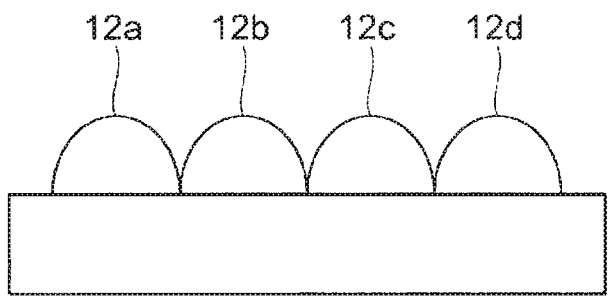
(b)
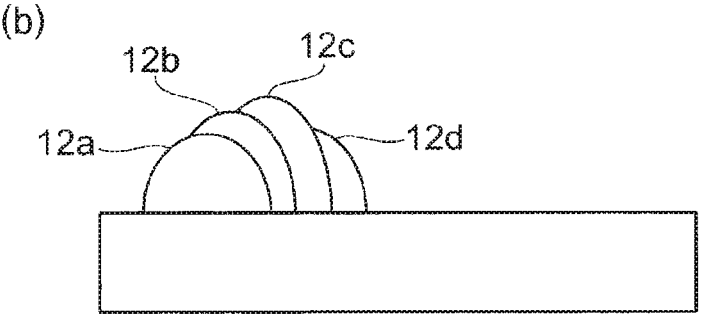
(c)
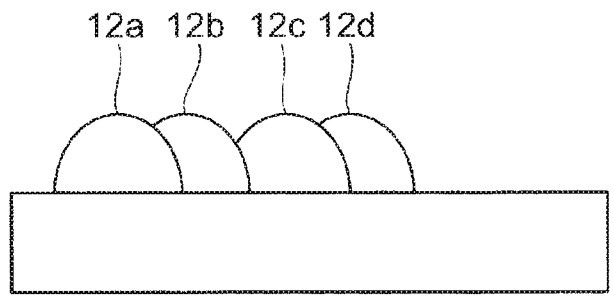

FIG. 6
(a)
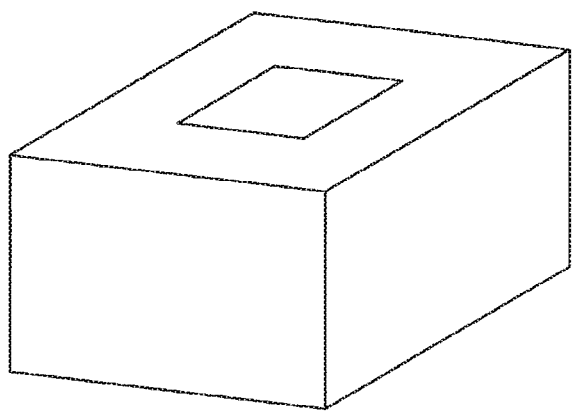
(b)
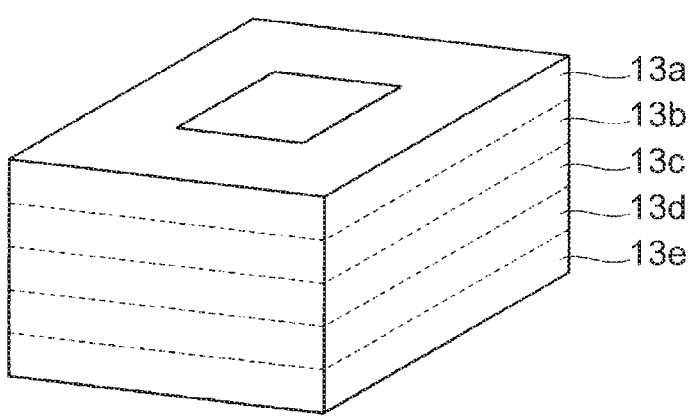

FIG. 8
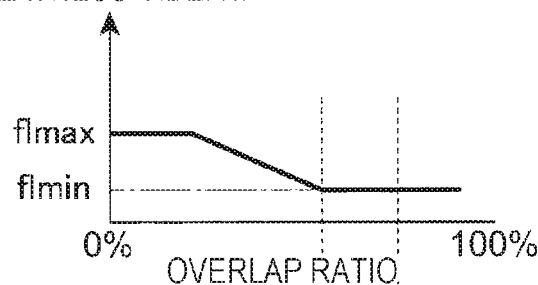
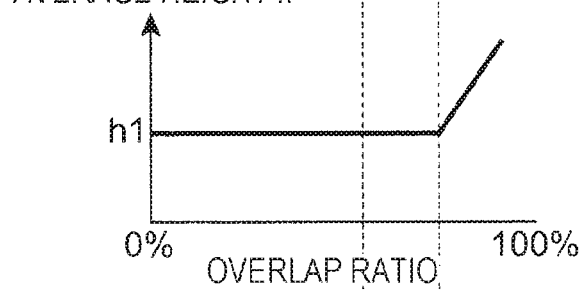
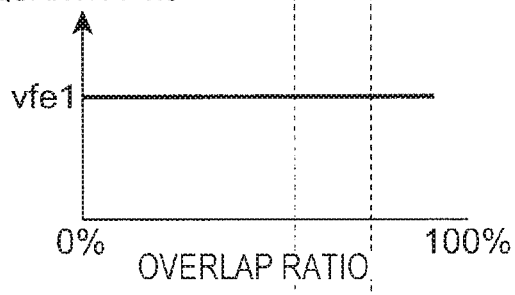
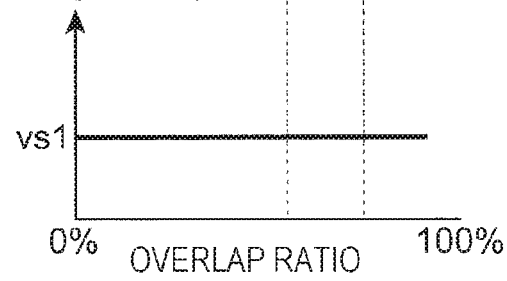

FIG. 9
(a)
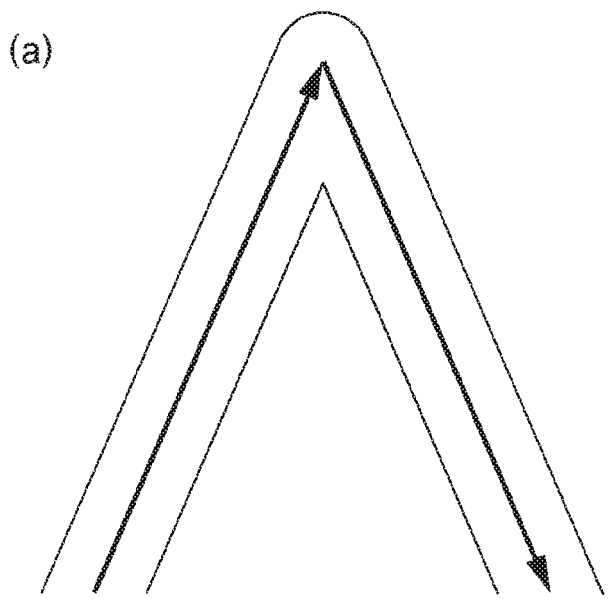
(b)
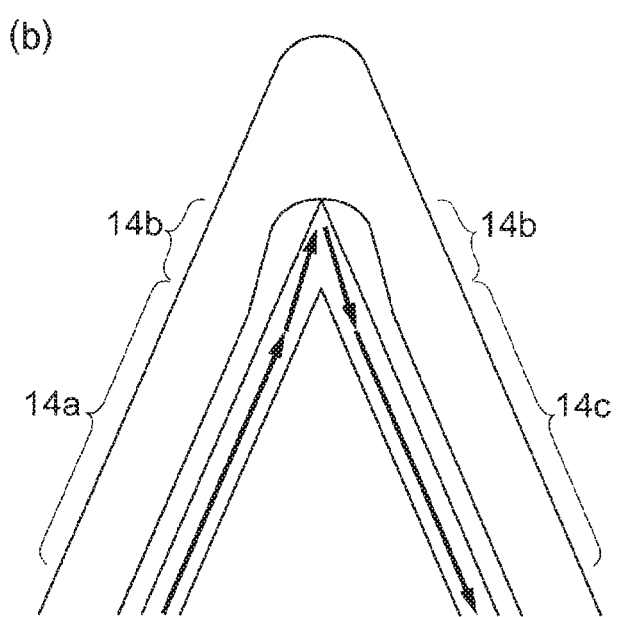

ADDITION CONTROLLER, ADDITION CONTROL METHOD, AND PROGRAM

TECHNICAL FIELD

The present invention relates to an addition controller, an addition control method, and a program that control an adding device configured to add molten metal layer by layer to form an object.

BACKGROUND ART

In recent years, there has been a growing need for 3D printers as means of production. Particularly for applications using metal materials, research and development toward the practical use has been carried out, for example, in the aviation industry. Three-D printers using metal materials are configured to melt metal powder or metal wire using a heat source, such as a laser or arc, to add molten metal layer by layer to form an object.

Techniques that involve adding molten metal layer by layer to form an object, as described above, have been known (see, e.g., Patent Literatures (PTLs) 1 and 2).

PTL 1 describes a mold manufacturing method that includes the steps of generating shape data representing the shape of a mold, dividing the mold into layers along contours on the basis of the generated shape data, and creating a travel path of a welding torch configured to supply filler metal on the basis of shape data of the resulting layers.

PTL 2 describes a three-dimensional modeling apparatus that includes a welding torch configured to deliver droplets of metal wire melted by arc discharge toward a substrate facing the welding torch; a moving mechanism configured to relatively move the substrate and the welding torch; a computing unit configured to compute a parameter value when a second weld bead is added to a first weld bead formed from a droplet, with the second weld bead being displaced from a center line of the first weld bead in an extending direction, the parameter value being a value for controlling the amount of droplets to be delivered, the computing unit being configured to compute the parameter value on the basis of the amount of the displacement from the center line; and a control unit configured to control the welding torch and the moving mechanism on the basis of the parameter value computed by the computing unit.

CITATION LIST

Patent Literature

PTL 1: Japanese Patent No. 3784539
PTL 2: Japanese Unexamined Patent Application Publication No. 2015-160217

SUMMARY OF INVENTION

Technical Problem

In the techniques that involve adding molten metal layer by layer to form an object, when the molten metal is supplied in the same quantity and at the same travel speed, the resulting molten beads (hereinafter simply referred to as "beads") have basically the same height if adjacent heads are sufficiently spaced apart. However, since actual objects may be solid ones, it is necessary not only that each layer have the same height, but also that a surface formed by beads arranged side by side be flat. If the surface is not flat, the resulting lack of weld deposition quantity, which occurs when the next layer is added, leads to a lower weld deposition height and widens the space between the welding torch and the deposited layers. As a result, for example, when the adding process is performed by arc welding, the lack of surface flatness makes it difficult to stabilize the arc. Moreover, depending on the degree to which the molten metal is cooled, gaps (or cavities) may be created and this may affect the quality of the object.

The techniques described in PTLs 1 and 2, which involve adding molten metal layer by layer to form an object, do not provide any methods for making a surface of a molten metal layer flat.

An object of the present invention is to make flat a surface of a layer of molten metal added by an adding device that is configured to add molten metal layer by layer to form an object.

Solution to Problem

To achieve the object described above, the present invention provides an addition controller that includes acquiring means for acquiring shape data representing a shape of a three-dimensional object; generating means for generating control information on the basis of the shape data acquired by the acquiring means, the control information being information for controlling an adding device configured to add molten metal layer by layer to form the object, the control information being information representing at least one of a trajectory of the adding device and an adding condition under which the adding device adds the molten metal layer by layer, the trajectory and the adding condition both making flat an upper surface of one of a plurality of layers obtained by adding the molten metal layer by layer; and output means for outputting the control information generated by the generating means.

The generating means may generate the control information representing the trajectory that allows adjacent beads of the molten metal to overlap to a specific overlap degree at which the upper surface of the one of the plurality of layers has a predetermined flatness.

For a trajectory segment along which adjacent beads of the molten metal do not overlap to the specific overlap degree, the trajectory segment being part of the trajectory, the generating means may generate the control information representing the adding condition under which the upper surface of the one of the plurality of layers has the predetermined flatness.

The generating means may generate the control information representing the adding condition that allows adjacent beads of the molten metal to overlap to a specific overlap degree at which the upper surface of the one of the plurality of layers has a predetermined flatness.

The generating means may generate the control information representing, as the adding condition, at least one of a quantity of the molten metal supplied by the adding device and a travel speed of the adding device.

The present invention also provides an addition control method including the steps of acquiring shape data representing a shape of a three-dimensional object; generating control information on the basis of the acquired shape data, the control information being information for controlling an adding device configured to add molten metal layer by layer to form the object, the control information being information representing at least one of a trajectory of the adding device and an adding condition under which the adding device adds the molten metal layer by layer, the trajectory and the adding condition both making flat an upper surface of one of a plurality of layers obtained by adding the molten metal layer by layer; and outputting the generated control information.

The present invention also provides a program causing a computer to implement the functions of acquiring shape data representing a shape of a three-dimensional object; generating control information on the basis of the acquired shape data, the control information being information for controlling an adding device configured to add molten metal layer by layer to form the object, the control information being information representing at least one of a trajectory of the adding device and an adding condition under which the adding device adds the molten metal layer by layer, the trajectory and the adding condition both making flat an upper surface of one of a plurality of layers obtained by adding the molten metal layer by layer; and outputting the generated control information.

Advantageous Effects of Invention

The present invention makes it possible to make flat a surface of a layer of molten metal added by an adding device that is configured to add molten metal layer by layer to form an object.

BRIEF DESCRIPTION OF DRAWINGS

FIG. 5(a) illustrates an example in which beads overlap at a low overlap ratio, FIG. 5(b) illustrates an example in which beads overlap at a high overlap ratio, and FIG. 5(c) illustrates an example in which beads overlap at an intermediate overlap ratio.

FIG. 6(a) is a diagram illustrating a work corresponding to CAD data, and FIG. 6(b) is a diagram illustrating the work to show thereon how the CAD data is divided.

FIG. 8 provides graphs each showing a relation between the overlap ratio and one of flatness, average height, weld deposition quantity, and travel speed, which are used to determine a trajectory.

FIG. 9(a) illustrates an example in which an overlap is not taken into account in a trajectory at a corner of a work, and FIG. 9(b) illustrates an example in which an overlap ratio changes in a trajectory at a corner of a work.

DESCRIPTION OF EMBODIMENTS

Hereinafter, embodiments of the present invention will be described in detail with reference to the attached drawings.

[Configuration of Metal Additive Manufacturing System]

Figure 1:
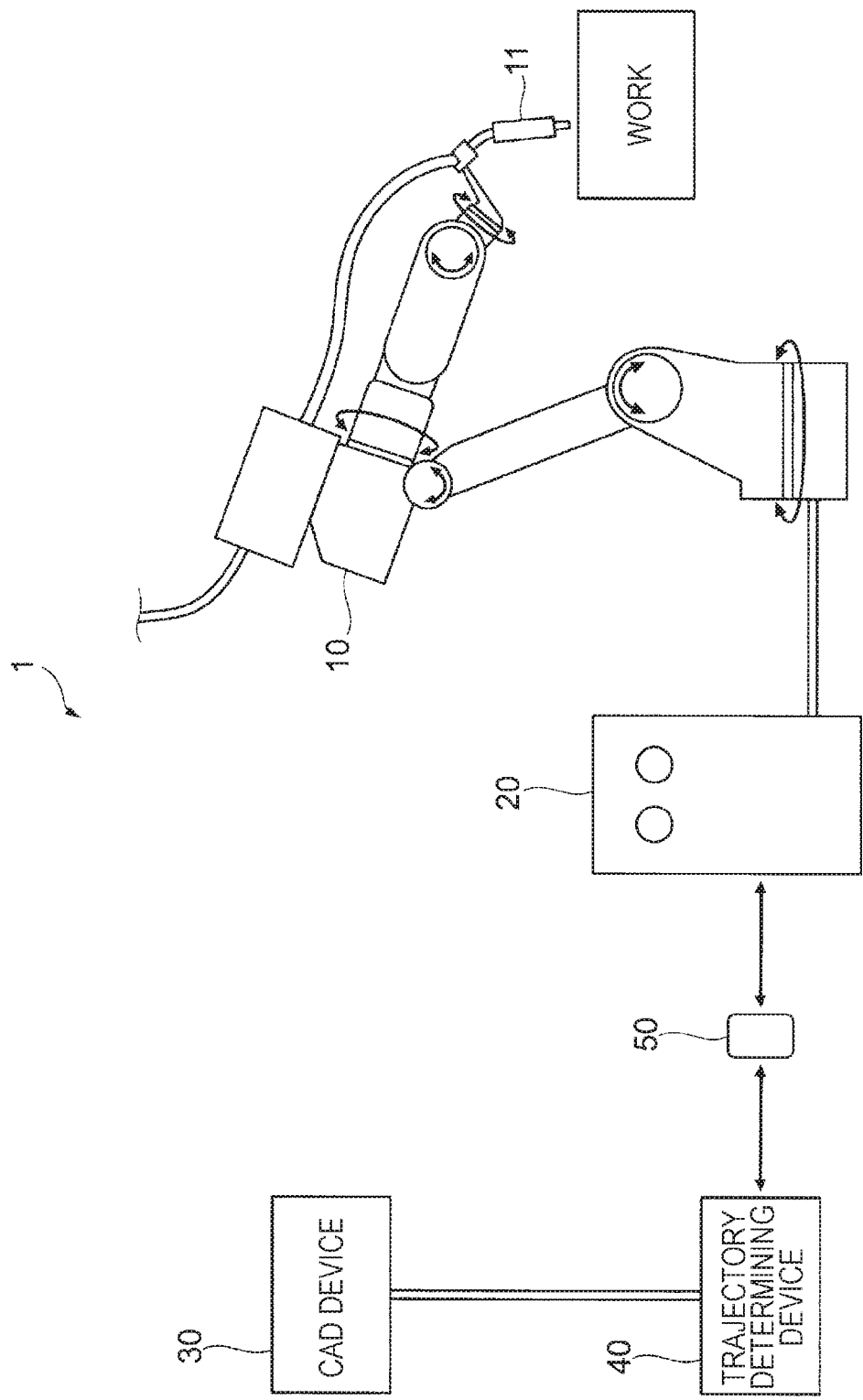
FIG. 1 schematically illustrates a configuration of a metal additive manufacturing system according to an embodiment of the present invention.

FIG. 1 schematically illustrates a configuration of a metal additive manufacturing system 1 according to the present embodiment.

As illustrated, the metal additive manufacturing system 1 includes a welding robot (manipulator) 10, a control panel 20, a CAD device 30, and a trajectory determining device 40. The trajectory determining device 40 is capable of writing a control program that controls the welding robot 10 to a removable recording medium 50, such as a memory card. The control panel 20 is capable of reading the control program written to the recording medium 50.

The welding robot 10 has an arm with multiple joints and performs various operations under control through the control panel 20. The welding robot 10 has, at an end of the arm, a welding torch 11 for welding a work. In the metal additive manufacturing system 1, the welding robot 10 uses the welding torch 11 to add molten metal layer by layer to form an object. That is, the welding torch 11 is an adding device that is configured to add molten metal layer by layer to form an object. Although arc is used as a heat source for melting the metal in the present embodiment, a laser or plasma may be used instead.

The control panel 20, which is disposed away from the welding robot 10, is configured to control the operation of the welding robot 10. By running the control program, the control panel 20 controls the location and position of the welding torch 11, and also controls the weld deposition quantity and the travel speed of the welding torch 11.

The CAD device 30 is a device for designing an object using a computer. The CAD device 30 stores CAD data that represents the shape of a three-dimensional object in three-dimensional coordinates.

The trajectory determining device 40 is a device that determines the trajectory of the welding torch 11 on the basis of CAD data representing the shape of an object, and outputs a control program including trajectory data representing the determined trajectory to the recording medium 50. In the present embodiment, the trajectory determining device 40 is provided as an addition controller.

[Overview of Present Embodiment]

When the metal additive manufacturing system 1 configured as described above forms, for example, a solid object, the present embodiment makes flat a surface formed by beads arranged side by side to stabilize the arc and improve the quality of the object. For this purpose, particularly the trajectory determining device 40 of the metal additive manufacturing system 1 performs a characteristic operation. Accordingly, the trajectory determining device 40 will be described in detail

[Hardware Configuration of Trajectory Determining Device]

Figure 2:
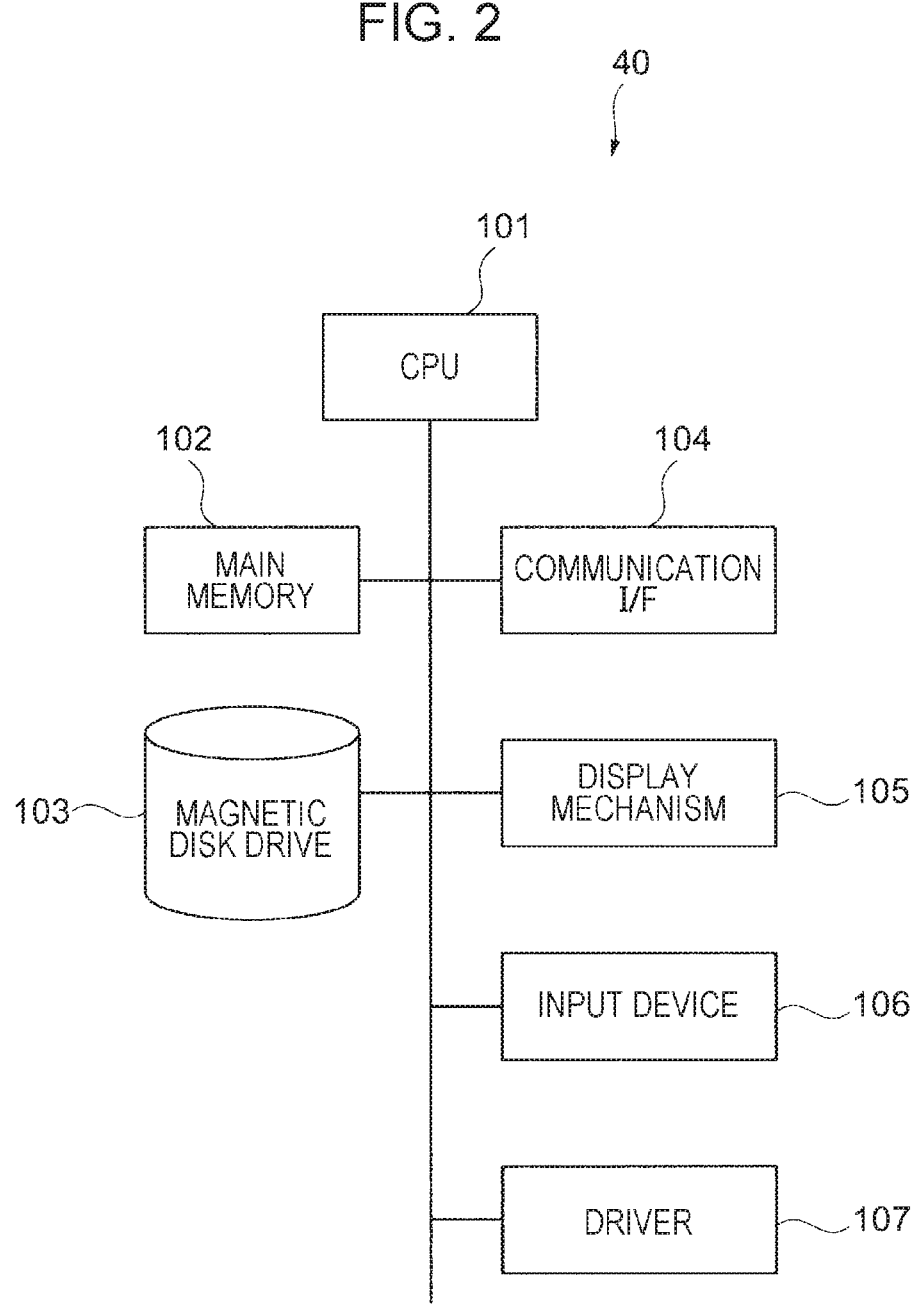
FIG. 2 is a diagram illustrating a hardware configuration of a trajectory determining device according to the embodiment of the present invention.

FIG. 2 is a diagram illustrating a hardware configuration of the trajectory determining device 40.

The trajectory determining device 40 is implemented, for example, by a general-purpose personal computer (PC). As illustrated, the trajectory determining device 40 includes a CPU 101 serving as computing means, and a main memory 102 and a magnetic disk drive (or hard disk drive (HDD)) 103 serving as storage means. The CPU 101 executes various programs, such as an operating system (OS) and application software, to implement functions of the trajectory determining device 40. The main memory 102 is a storage area for storing, for example, various programs and data used to execute the programs. The HDD 103 is a storage area for storing, for example, data input to various programs and data output from the various programs.

The trajectory determining device 40 also includes a communication I/F 104 for communication with external devices, a display mechanism 105 including a video memory and a display, an input device 106 including a keyboard and a mouse, and a driver 107 for reading and writing data from and to a storage medium. Note that FIG. 2 merely illustrates a hardware configuration of the trajectory determining device 40 implemented by a computer system. The trajectory determining device 40 is not limited to the configuration illustrated in FIG. 2.

[Functional Configuration of Trajectory Determining Device]

Figure 3:
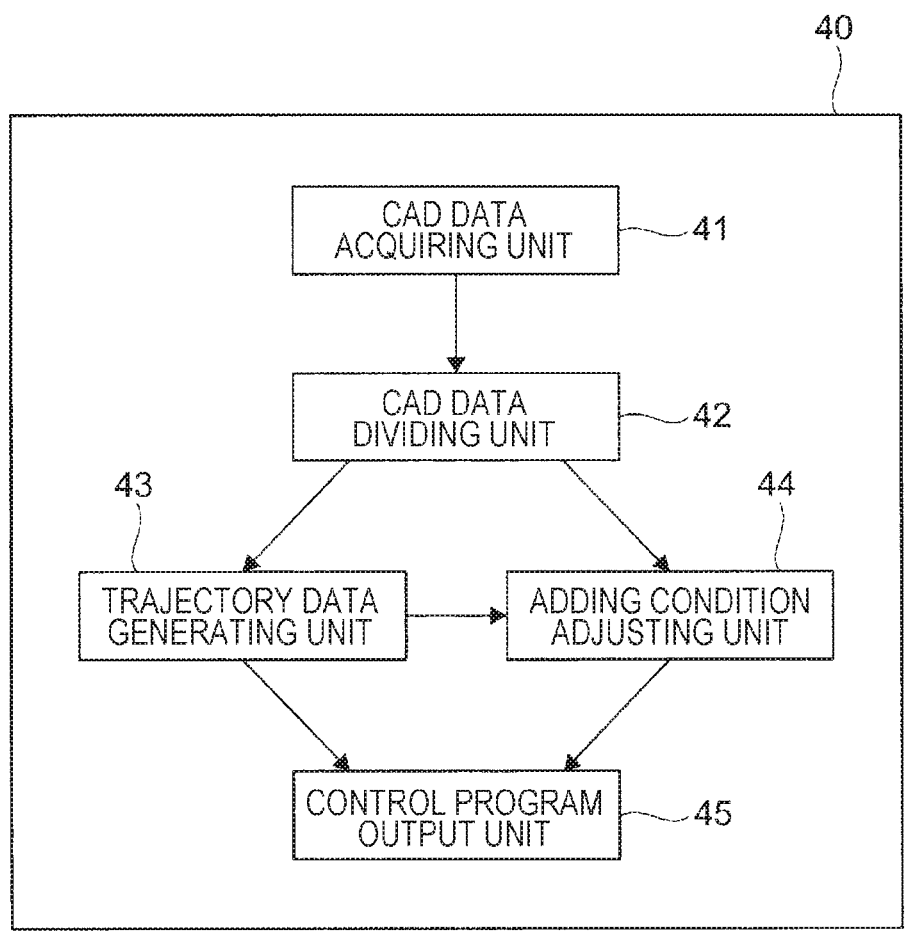
FIG. 3 is a diagram illustrating a functional configuration of the trajectory determining device according to the embodiment of the present invention.

FIG. 3 is a diagram illustrating a functional configuration of the trajectory determining device 40 according to the present embodiment. As illustrated, the trajectory determining device 40 includes a CAD data acquiring unit 41, a CAD data dividing unit 42, a trajectory data generating unit 43, an adding condition adjusting unit 44, and a control program output unit 45.

The CAD data acquiring unit 41 acquires CAD data from the CAD device 30. In the present embodiment, CAD data is used as an example of shape data that represents the shape of an object, and the CAD data acquiring unit 41 is provided as an example of acquiring means that acquires the shape data.

The CAD data dividing unit 42 divides the CAD data acquired by the CAD data acquiring unit 41 into a plurality of layers.

On the basis of CAD data of each of the layers obtained by the CAD data dividing unit 42, the trajectory data generating unit 43 determines, for each of the layers, the trajectory of the welding torch 11 that allows beads to overlap such that the overlap ratio between beads falls within an overlap ratio range where an upper surface formed by beads arranged side by side is flat, and then the trajectory data generating unit 43 generates trajectory data representing the determined trajectory. In the present embodiment, the trajectory data is used as an example of control information that controls the adding device and represents its trajectory which makes flat the upper surface of one of a plurality of layers formed by adding molten metal layer by layer. Also in the present embodiment, the trajectory data generating unit 43 is provided as an example of generating means that generates the control information.

On the basis of CAD data of each of the layers obtained by the CAD data dividing unit 42, the adding condition adjusting unit 44 adjusts, for each of the layers, an adding condition for a segment of the trajectory determined by the trajectory data generating unit 43, the segment being a part where the overlap ratio between beads is found to be out of range. Hereinafter, the adding condition is described both as the quantity of weld deposition made by the welding torch 11 per unit length of the welding torch trajectory (which will hereinafter be simply referred to as "weld deposition quantity") and also as the travel speed of the welding torch 11. The adding condition may include only one of the weld deposition quantity and the travel speed described above, or may include other conditions. In the present embodiment, the adding condition is used as an example of control information that controls the adding device and represents an adding condition under which the adding device adds molten metal layer by layer in such a manner as to make flat the upper surface of one of a plurality of layers formed by additions of molten metal, or is used as an example of control information that represents at least one of the quantity of molten metal supplied by the adding device and the travel speed of the adding device. Also, the adding condition adjusting unit 44 is provided as an example of generating means that generates the control information.

The control program output unit 45 outputs, to the recording medium 50, a control program that includes the trajectory data generated by the trajectory data generating unit 43 and the adding condition adjusted by the adding condition adjusting unit 44. In the present embodiment, the control program output unit 45 is provided as an example of output means that outputs the control information.

[Operation of Trajectory Determining Device]

(Overview)

Figure 4:
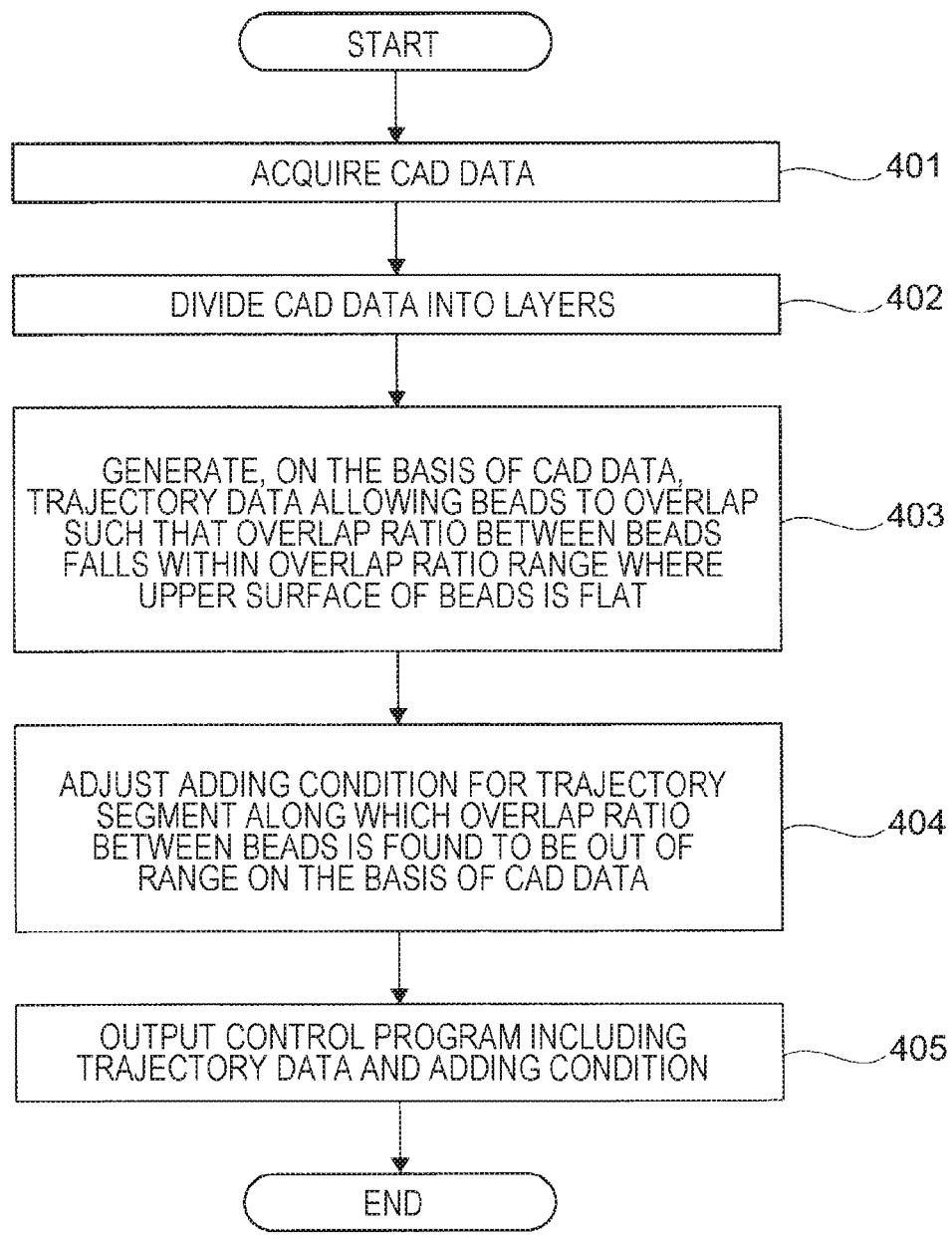
FIG. 4 is a flowchart illustrating an operation of the trajectory determining device according to the embodiment of the present invention.

FIG. 4 is a flowchart illustrating an operation of the trajectory determining device 40 according to the present embodiment.

When the operation of the trajectory determining device 40 starts, the CAD data acquiring unit 41 first acquires CAD data from the CAD device 30 (step 401).

Then, the CAD data dividing unit 42 divides the CAD data acquired in step 401 into a plurality of layers (step 402).

For each of the plurality of layers obtained in step 402, the trajectory data generating unit 43 determines, on the basis of the CAD data, the trajectory of the welding torch 11 that allows beads to overlap such that the overlap ratio between beads falls within an overlap ratio range where an upper surface formed by beads arranged side by side is flat. The trajectory data generating unit 43 then generates trajectory data that represents this trajectory (step 403).

For each of the plurality of layers obtained in step 402, the adding condition adjusting unit 44 adjusts an adding condition for a segment of the trajectory determined in step 403, the segment being a part where the overlap ratio between beads is found to be out of range on the basis of the CAD data (step 404). Here, the adding condition may include the quantity of molten metal deposited by the welding torch 11 and the travel speed of the welding torch 11.

Last, the control program output unit 45 outputs a control program, including the trajectory data generated in step 403 and the adding condition adjusted in step 404, to the recording medium 50 (step 405).

(Actions)

FIGS. 5(a) to 5(c) illustrate actions of the operation described above. FIGS. 5(a) to 5(c) show how the overlap ratio between adjacent ones of beads 12a to 12d, the flatness of an upper surface formed by the beads 12a to 12d arranged side by side, and the average height representing an average of the heights of the beads 12a to 12d relate to one another. FIG. 5(a) illustrates an example in which the beads 12a to 12d overlap at the lowest overlap ratio and the upper surface is not flat. FIG. 5(b) illustrates an example in which the beads 12a to 12d overlap at the highest overlap ratio. In FIG. 5(b), the upper surface is nearly flat, but the average height is high. FIG. 5(c) illustrates an example in which the beads 12a to 12d overlap at an overlap ratio intermediate between those in FIG. 5(a) and FIG. 5(b). In FIG. 5(c), the upper surface is flat and the average height is at a proper level.

Assume that by running the control program output in step 405 of FIG. 4, the trajectory data generated in step 403 and the adding condition adjusted in step 404 are provided to the welding robot 10. Thus, when the welding robot 10 adds beads to those arranged side by side, the beads can be arranged without spaces therebetween and can form an upper surface that is flat, as illustrated in FIG. 5(*c*).

Hereinafter, the operation performed in each step will be described in detail.

(Details of Step 401)

In step 401, the CAD data acquiring unit 41 acquires CAD data of a work. FIG. 6(*a*) is a diagram illustrating an example of the work. Although a diamond-shaped solid object is used as an example here, the work may be an object of any other shape. Also, CAD data of the work may be of any type that conforms to the CAD data format used in the CAD device 30.

(Details of Step 402)

In step 402, the CAD data dividing unit 42 divides the CAD data into a plurality of layers. FIG. 6(*b*) is a diagram illustrating the work of FIG. 6(*a*) to show thereon how the CAD data is divided. In this diagram, portions 13*a* to 13*e*, each sandwiched between upper and lower broken lines adjacent to each other, represent a plurality of layers obtained by dividing the CAD data. In the present embodiment, CAD data is divided into a plurality of layers each having a proper height of the beads illustrated in FIG. 5(*c*).

(Details of Step 403)

In step 403, the trajectory data generating unit 43 determines the trajectory that allows beads to overlap such that the overlap ratio between beads falls within the overlap ratio range where an upper surface formed by beads arranged side by side is flat. To determine the trajectory such that beads overlap at this overlap ratio, it is necessary to obtain not only the bead height, but also the overlap ratio and the flatness of beads arranged side by side.

Figure 7:
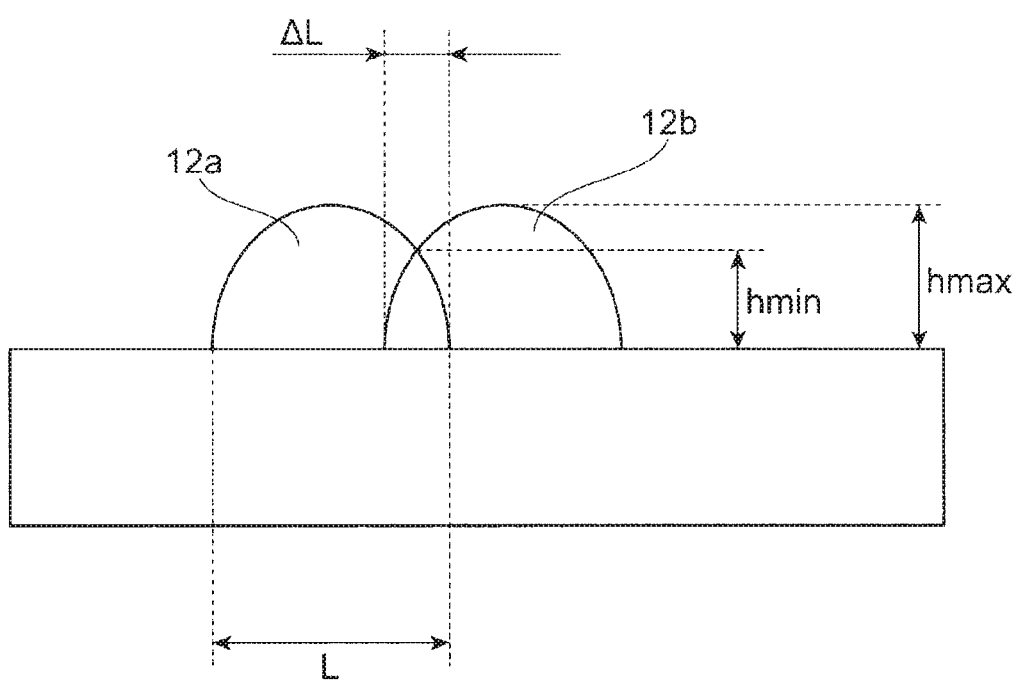
FIG. 7 is a diagram for explaining how the overlap ratio and the flatness of beads arranged side by side are calculated.

FIG. 7 is a diagram for explaining how the overlap ratio and the flatness of the beads 12*a* and 12*b* arranged side by side are calculated. Although the beads 12*a* and 12*b* are not exactly of the same size, they are treated as being of the same size, for ease of explanation. When no distinction between the bead 12*a* and the bead 12*b* is necessary, they are collectively referred to as "bead 12". The overlap ratio x(%) is calculated by "x=($\Delta$L/L)×100", where L is the width of the bead 12 and $\Delta$L is the width of the overlapping portion of the bead 12*a* and the bead 12*b*. A flatness index fl is calculated by "fl=|hmax−hmin|", where hmax is the maximum height of the bead 12 and hmin is the minimum height of the bead 12. The width L, the maximum height hmax and the minimum height hmin of the bead 12, and the width $\Delta$L of the overlapping portion of the bead 12*a* and the bead 12*b* may be values measured by experiment, or may be values estimated by calculation from the cross-sectional area of molten metal.

FIG. 8 illustrates information the trajectory data generating unit 43 uses to determine the trajectory. In the present embodiment, bead-on-plate welding and additions of several layers are performed for each of the combinations of a plurality of weld deposition quantities vfe (conditions) and a plurality of travel speeds vs (conditions), and a relation between the overlap ratio and the average height h of each layer and the flatness index fl of the upper surface of the layer, is measured. Typically, the bead height during the initial layer addition differs from that during the subsequent layer additions. Measuring the average height h of each layer thus involves measuring both of them.

In FIG. 8, the graph at the top (hereinafter referred to as "flatness graph") shows a measured relation between the flatness index fl and the overlap ratio. The flatness index fl is an index indicating the level of flatness. The higher the flatness, the smaller the value of the flatness index fl. The vertical axis of the flatness graph represents the value of the flatness index fl. This means that the value of the flatness index fl is larger and the flatness is lower on the upper side of the graph, whereas the value of the flatness index fl is smaller and the flatness is higher on the lower side of the graph. The flatness graph shows that the flatness index fl stays at flmax until the overlap ratio reaches a first threshold, and that when the overlap ratio exceeds the first threshold, the flatness increases and the flatness index fl stays at flmin after the overlap ratio exceeds a second threshold.

The second graph from the top (hereinafter referred to as "average height graph") shows a measured relation between the average height h and the overlap ratio. The average height graph shows that the average height h stays at h1 until the overlap ratio reaches a threshold, and that the average height h begins to increase when the overlap ratio exceeds the threshold.

The third graph from the top (hereinafter referred to as "weld deposition quantity graph") shows a relation between the weld deposition quantity vfe (condition) and the overlap ratio. The weld deposition quantity graph shows that the weld deposition quantity vfe is set at vfe1 regardless of the overlap ratio.

The graph at the bottom (hereinafter referred to as "travel speed graph") shows a relation between the travel speed vs (condition) and the overlap ratio. The travel speed graph shows that the travel speed vs is set at vs1 regardless of the overlap ratio.

That is, FIG. 8 shows that when the weld deposition quantity vfe was vfe1 and the travel speed vs was vs1, the relation between the flatness index fl and the overlap ratio shown in the flatness graph and the relation between the average height h and the overlap ratio shown in the average height graph were obtained as a result of measurement. Such a result of measurement made for the combinations of a plurality of weld deposition quantities vfe (conditions) and a plurality of travel speeds vs (conditions) is stored in a memory (not shown) that can be referenced by the trajectory data generating unit 43.

In this state, the trajectory data generating unit 43 first selects a combination of weld deposition quantity and travel speed where the overlap ratio range in which the average height h is within a desired range is wider than a certain width. For example, when the height h1 is a height within a desired range, since the overlap ratio range corresponding to the average height h1 is wide in the average height graph in FIG. 8, the combination of the weld deposition quantity vfe1 and the travel speed vs1 in FIG. 8 is selected from combinations of a plurality of weld deposition quantities and travel speeds (conditions). As the desired range, for example, a narrow range including the height of layers obtained by the division in step 402 may be used. Next, the trajectory data generating unit 43 selects, in the selected combination, a specific overlap ratio from the overlap ratio range where the flatness index fl is smallest (i.e., flatness is highest) and the average height h is within the desired range. For example, when the combination of the weld deposition quantity vfe1 and the travel speed vs1 in FIG. 8 is selected, the specific overlap ratio is selected from the overlap ratio range (i.e., range sandwiched between broken lines) where the flatness index fl is flmin and the average height h is h1. Last, the trajectory data generating unit 43 determines the trajectory that allows adjacent beads to overlap at the specific overlap ratio, and then generates trajectory data representing the determined trajectory.

In this manner, the trajectory data generating unit 43 generates trajectory data for all layers.

In the example described above, a specific overlap ratio is selected from the overlap ratio range where the flatness index fl is smallest and the average height h is within a desired range. However, this may be carried out differently. For trample, the condition that the flatness index fl is smallest may be replaced by the condition that the flatness index fl is within a predetermined range, and the condition that the average height h is within a desired range may be excluded. The procedure of selecting from the overlap ratio range may also be excluded. The overlap ratio representing the degree of overlap may be expressed in measures other than "ratios". In this sense, trajectory data can be regarded as an example of control information representing a trajectory that allows adjacent beads of molten metal to overlap to a specific overlap degree at which the upper surface of a layer has a predetermined flatness.

(Details of Step 404)

In step 404, if there is a trajectory segment along which beads overlap at an overlap ratio outside the overlap ratio range determined in step 403, the adding condition adjusting unit 44 adjusts the weld deposition quantity and the travel speed for this trajectory segment.

FIGS. 9(a) and 9(b) illustrate an example where the overlap ratio between beads is out of range. FIG. 9(a) illustrates an ideal state where, in the trajectory determined in step 403, an overlap between beads is not taken into account. However, this is not the case in practice. For example, at a corner of the diamond-shaped object illustrated in FIGS. 6(a) and 6(b), the overlap ratio between beads changes. FIG. 9(b) illustrates a state where the overlap ratio changes along the trajectory determined in step 403. The overlap ratio is constant during movement of the welding torch 11 along a trajectory segment 14a. When the welding torch 11 reaches a trajectory segment 14b, the overlap ratio changes because of the geometric characteristics of the diamond shape. Then, the overlap ratio becomes constant again after the welding torch 11 begins to move along a trajectory segment 14c.

Figure 10:
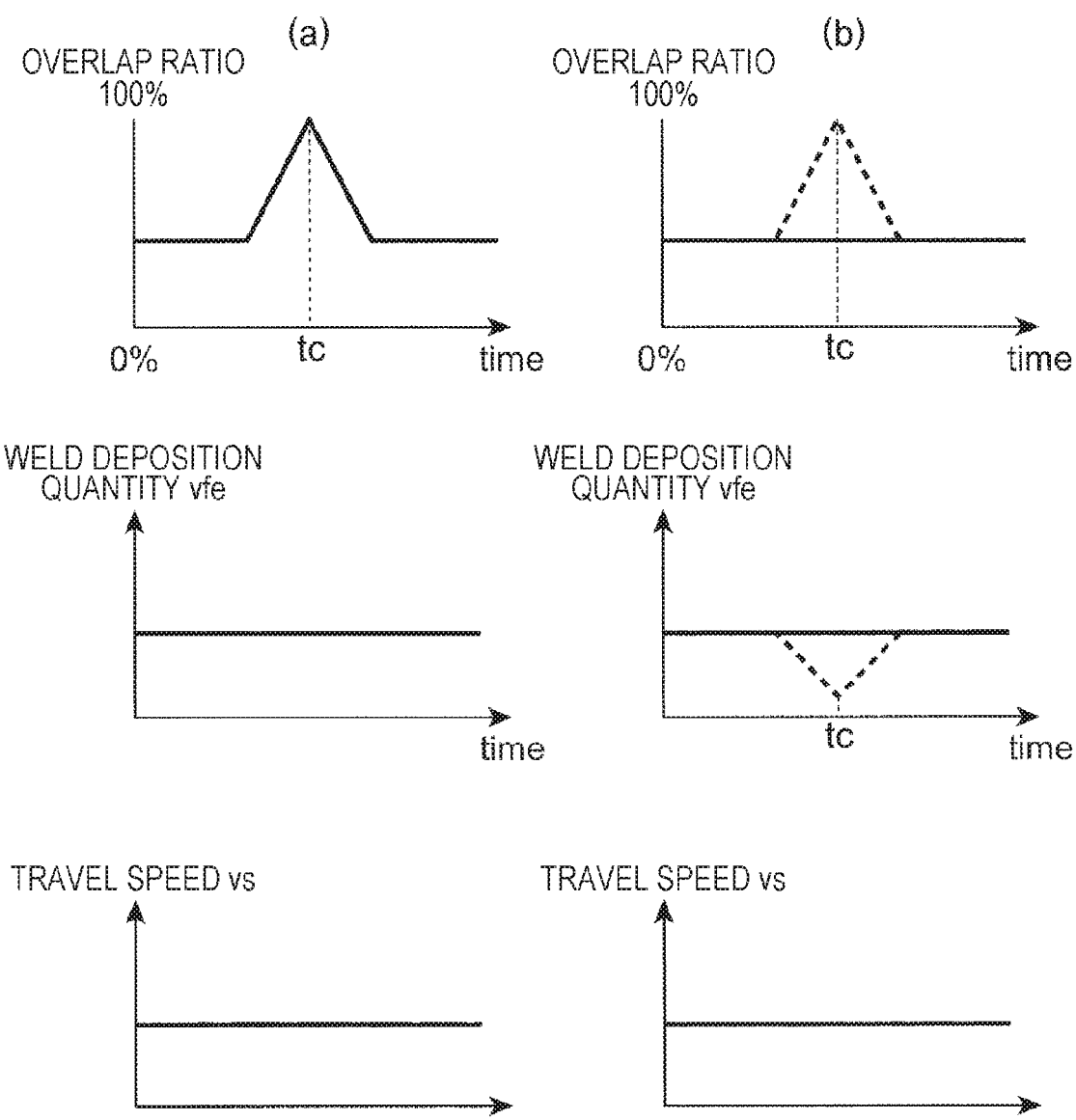
FIG. 10(a) provides graphs showing how the overlap ratio changes when the weld deposition quantity and the travel speed are constant, and FIG. 10(b) provides graphs showing how the weld deposition quantity changes when the overlap ratio and the travel speed are constant.

FIG. 10(a) provides graphs showing how the overlap ratio changes as the welding torch 11 is moved along the trajectory determined in step 403 such that the weld deposition quantity and the travel speed are constant. As illustrated, the overlap ratio is initially at the specific overlap ratio selected in step 403. Then, before time tc at which the welding torch 11 reaches a corner, the overlap ratio begins to gradually increase. After time tc, the overlap ratio decreases and reaches the specific overlap ratio selected in step 403.

Thus, when the overlap ratio increases and exceeds the range selected in step 403, the adding condition adjusting unit 44 reduces the weld deposition quantity vfe or increases the travel speed vs.

FIG. 10(b) provides graphs showing how the weld deposition quantity changes as the welding torch 11 is moved along the trajectory determined in step 403 such that the overlap ratio and the travel speed are constant. In the graphs of FIG. 10(b), a change from the corresponding graph in FIG. 10(a) is indicated by a broken line to clarify the difference between them. The weld deposition quantity is initially at the level selected in step 403. Before time tc at which the welding torch 11 reaches the corner, the adding condition adjusting unit 44 begins to gradually reduce the weld deposition quantity. After time tc, the adding condition adjusting unit 44 increases the weld deposition quantity to the level selected in step 403.

Figure 11:
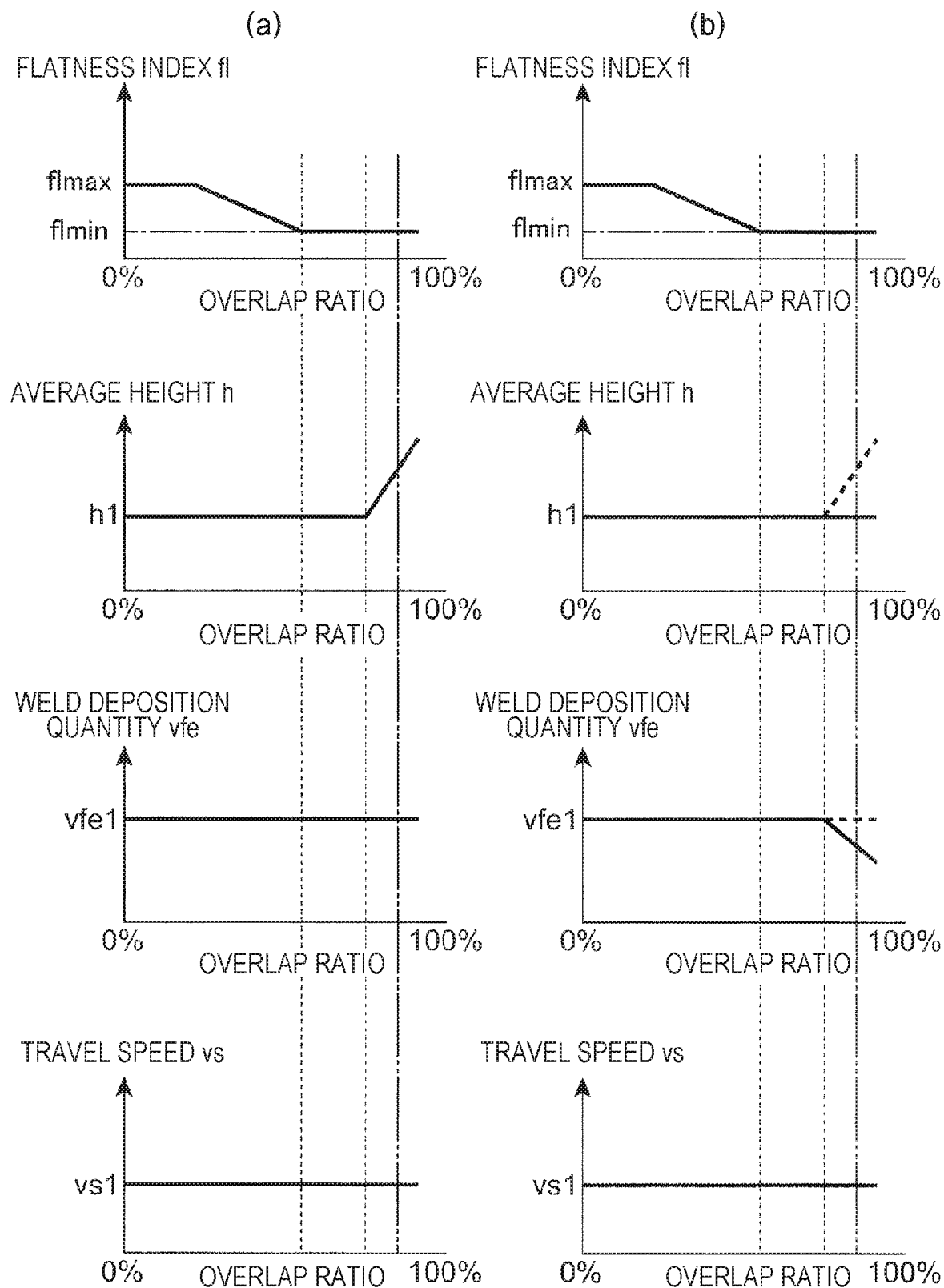
FIG. 11(a) provides graphs showing an example where the overlap ratio is increased to exceed a range by the relation between the overlap ratio and the flatness, average height, weld deposition quantity, and travel speed, and FIG. 11(b) provides graphs showing an example where an increase in average height is reduced by the relation between the overlap ratio and the flatness, average height, weld deposition quantity, and travel speed.

This adjustment of the weld deposition quantity will now be described with reference to the graphs of FIG. 11.

FIG. 11(a) shows an example in which the overlap ratio between beads in FIG. 8 exceeds the overlap ratio range selected in step 403. In the drawing, the overlap ratio between beads in this case is indicated by a two-dot chain line.

On the other hand, FIG. 11(b) shows an example in which, as the overlap ratio between beads increases beyond the overlap ratio range selected in step 403, the weld deposition quantity vfe is reduced to prevent an increase in average height h and make the upper surface flat. In the graphs of FIG. 11(b), a change from the corresponding graph in FIG. 11(a) is indicated by a broken line to clarify the difference between them. While not shown, the travel speed vs may be increased to prevent an increase in average height h and make the upper surface flat. Conversely, if the overlap ratio between beads drops below the overlap ratio range selected in step 403, the weld deposition quantity vfe may be increased or the travel speed vs may be reduced.

In this manner, the adding condition adjusting unit 44 adjusts the weld deposition quantity and the travel speed for all layers.

When the overlap ratio between beads exceeds the range in the example described above, an increase in average height h is prevented to make the upper surface flat. However, this may be carried out differently. For example, it is not necessarily required to prevent an increase in average height h. The upper surface may be made flat by setting the overlap ratio such that the flatness index fl of the upper surface falls within a predetermined range. In this sense, an adding condition can be regarded as an example of control information representing an adding condition under which adjacent beads of molten metal overlap to a specific overlap degree at which the upper surface of a layer has a predetermined flatness.

(Details of Step 405)

In step 405, the control program output unit 45 outputs a control program including the trajectory data and the adding condition. Specifically, the control program output unit 45 outputs, to the recording medium 50, a control program that indicates the location and position of the welding torch 11 of the welding robot 10 in accordance with the trajectory data and provides the weld deposition quantity (current value) and the travel speed to the welding robot 10. The control program is loaded from the recording medium 50 into the control panel 20, where the control program runs to cause the welding robot 10 to form an object by adding molten metal layer by layer.

[Modifications of Present Embodiment]

In the embodiment described above, the trajectory data generating unit 43 determines a trajectory that allows beads to overlap such that the overlap ratio between beads falls within an overlap ratio range where an upper surface formed by beads arranged side by side is flat, and the adding condition adjusting unit 44 adjusts an adding condition for a trajectory segment along which the overlap ratio between beads is out of range. Alternatively, the trajectory data generating unit 43 may determine the trajectory without taking into account the overlaps between beads, and the adding condition adjusting unit 44 may adjust the adding condition such that the overlap ratio between beads falls within the overlap ratio range where an upper surface formed by beads arranged side by side is flat. In this sense, the trajectory data and the adding condition can be regarded as an example of control information that controls the adding device and represents at least one of the trajectory of the adding device and the adding condition under which the adding device adds the molten metal layer by layer, the trajectory and the adding condition both making flat the upper surface of one of a plurality of layers obtained by adding the molten metal layer by layer.

[Advantageous Effects of Present Embodiment]

As described above, in the present embodiment, the trajectory of a molten metal supply source, such as a welding torch, is determined such that a surface formed by adjacent beads is flat. At the same time, the weld deposition quantity of the molten metal and the travel speed of a tool that supplies the molten metal are adjusted to allow the overlap ratio between beads to fall within a specified range. Thus, a decrease in weld deposition height caused by a lack of weld deposition quantity is less likely to occur, and the space between the tool that supplies molten metal and the deposited layers is less likely to widen. Since this enables stable and tight addition of layers for forming an object, it is possible to prevent the loss of quality caused by the presence of cavities and the like.

The present application is based on Japanese Patent Application No. 2016-027353 filed Feb. 16, 2016, which is hereby incorporated by reference herein in its entirety.

REFERENCE SIGNS LIST

1: metal additive manufacturing system, 10: welding robot, 11: welding torch, 20: control panel, 30: CAD device, 40: trajectory determining device, 41: CAD data acquiring unit, 42: CAD data dividing unit, 43: trajectory data generating unit, 44: adding condition adjusting unit, 45: control program output unit, 50: recording medium

The invention claimed is:

1. An addition controller for controlling an adding device configured to add molten metal layer by layer to form an object, the addition controller comprising a processor and a memory, the processor configured to:
   acquire shape data representing a shape of a three-dimensional object;
   divide the shape data into a plurality of layers;
   for each layer among the plurality of layers
      determine a trajectory of the adding device that provides beads having an overlap ratio within a predetermined range,
      based on the shape data and the determined trajectory of the adding device, determine one or more segments of the determined trajectory having an overlap ratio that is outside of the predetermined range,
      adjust an adding condition of the adding device based on the overlap ratio being outside the predetermined range, for each of the one or more segments, to form a layer with an upper surface having a layer flatness and an average height, and
      generate control information based on the trajectory of the adding device and the adjusted adding condition; and output the generated control information to the adding device, wherein
   the layer flatness is controlled by the overlap ratio to achieve a predetermined flatness, and
   the average height is controlled by the adjusted adding condition of the adding device.

2. An addition control method for controlling an adding device configured to add molten metal layer by layer to form an object, control method comprising the steps of:
   acquiring shape data representing a shape of a three-dimensional object;
   dividing the shape data into a plurality of layers;
   for each layer among the plurality of layers
      determining a trajectory of the adding device that provides beads having an overlap ratio within a predetermined range,
      based on the shape data and the determined trajectory of the adding device, determine one or more segments of the determined trajectory having an overlap ratio that is outside of the predetermined range,
      adjusting an adding condition of the adding device based on the overlap ratio being outside the predetermined range, for each of the one or more segments, to form a layer with an upper surface having a layer flatness and an average height, and
      generating control information based on the trajectory of the adding device and the adjusted adding condition; and
   outputting the generated control information, wherein
   the layer flatness is controlled by the overlap ratio to achieve a predetermined flatness, and
   the average height is controlled by the adjusted adding condition of the adding device.

3. A non-transitory computer readable storage medium having stored thereon a program for controlling an adding device configured to add molten metal layer by layer to form an object, the program causing a processor to execute functions comprising:
   acquiring shape data representing a shape of a three-dimensional object;
   dividing the shape data into a plurality of layers;
   for each layer among the plurality of layers
      determining a trajectory of the adding device that provides beads having an overlap ratio within a predetermined range,
      based on the shape data and the determined trajectory of the adding device, determine one or more segments of the determined trajectory having an overlap ratio that is outside of the predetermined range,
      adjusting an adding condition of the adding device based on the overlap ratio being outside the predetermined range, for each of the one or more segments, to form a layer with an upper surface having a layer flatness and an average height, and
      generating control information based on the trajectory of the adding device and the adjusted adding condition; and
   outputting the generated control information, wherein
   the layer flatness is controlled by the overlap ratio to achieve a predetermined flatness, and
   the average height is controlled by the adjusted adding condition of the adding device.

* * * * *